(12) United States Patent
Stolte et al.

(10) Patent No.: US 10,330,279 B2
(45) Date of Patent: Jun. 25, 2019

(54) LUMINAIRE WITH REAR-MOUNTED SENSING ASSEMBLY

(71) Applicant: KENALL MANUFACTURING COMPANY, Kenosha, WI (US)

(72) Inventors: Brandon Stolte, Lindenhurst, IL (US); Diane Murphy, Twin Lakes, WI (US); Patrick J. Marry, Hawthorn Woods, IL (US)

(73) Assignee: KENALL MANUFACTURING COMPANY, Kenosha, WI (US)

( * ) Notice: Subject to any disclaimer, the term of this patent is extended or adjusted under 35 U.S.C. 154(b) by 0 days.

(21) Appl. No.: 15/666,325

(22) Filed: Aug. 1, 2017

(65) Prior Publication Data
US 2019/0041026 A1    Feb. 7, 2019

(51) Int. Cl.
| | |
|---|---|
| *F21V 7/04* | (2006.01) |
| *F21V 3/00* | (2015.01) |
| *F21V 19/00* | (2006.01) |
| *F21V 8/00* | (2006.01) |
| *F21V 29/74* | (2015.01) |
| *H05B 37/02* | (2006.01) |
| *F21Y 105/18* | (2016.01) |
| *F21Y 115/10* | (2016.01) |
| *H05B 33/08* | (2006.01) |

(52) U.S. Cl.
CPC .................. *F21V 3/00* (2013.01); *F21V 7/04* (2013.01); *F21V 19/0015* (2013.01); *F21V 29/74* (2015.01); *G02B 6/0096* (2013.01); *F21Y 2105/18* (2016.08); *F21Y 2115/10* (2016.08); *H05B 33/0854* (2013.01); *H05B 37/0218* (2013.01)

(58) Field of Classification Search
CPC ... F21V 3/00; F21V 7/04; F21V 29/74; F21V 19/0015; F21Y 2115/10; F21Y 2105/18; G02B 6/0096; H05B 33/0854; H05B 37/0218
See application file for complete search history.

(56) References Cited

U.S. PATENT DOCUMENTS

| | | | |
|---|---|---|---|
| 6,441,943 B1 * | 8/2002 | Roberts ................ | B60Q 1/2665 359/267 |
| 6,909,239 B2 * | 6/2005 | Gauna .................... | F21S 8/035 315/134 |
| 6,940,230 B2 * | 9/2005 | Myron ................ | H05B 37/0227 315/159 |
| 8,686,663 B2 * | 4/2014 | Ishikita .............. | H05B 37/0272 315/294 |
| 9,681,520 B1 * | 6/2017 | Berry ................. | H05B 37/0218 |

(Continued)

*Primary Examiner* — Ali Alavi
(74) *Attorney, Agent, or Firm* — Marshall, Gerstein & Borun LLP; Randall G. Rueth

(57) ABSTRACT

A luminaire with various sensing capabilities is provided. According to one aspect, the luminaire may include a housing and a lens covering an opening formed in the housing. In addition, the luminaire may include a sensing assembly which is disposed in the housing and configured to detect changes in an environment outside the housing. A light source may also be disposed in the housing and configured to emit light in a forward direction toward the lens. The sensing assembly may be positioned rearward of at least a portion of the light source.

20 Claims, 7 Drawing Sheets

(56) References Cited

U.S. PATENT DOCUMENTS

| | | | | |
|---|---|---|---|---|
| 2010/0294961 A1* | 11/2010 | Ashdown | ............... | G01J 1/04 250/552 |
| 2015/0091451 A1* | 4/2015 | Williams | ............... | H02J 9/065 315/160 |
| 2016/0123569 A1* | 5/2016 | Cummings | ............ | F21S 2/005 362/249.02 |
| 2016/0375162 A1* | 12/2016 | Marry | ............... | H05B 33/0854 422/22 |

* cited by examiner

LUMINAIRE WITH REAR-MOUNTED SENSING ASSEMBLY

FIELD OF DISCLOSURE

The present disclosure generally relates to luminaires and, more particularly, to luminaires having various sensing capabilities.

BACKGROUND

Many commercial buildings, parking structures, transportation areas or structures (e.g., tunnels), and the like are equipped with lighting systems that include one or more luminaires or light fixtures for illuminating certain areas. Some luminaires are equipped with one or more sensors for detecting changes in the surrounding environment. Typically such sensors are mounted on the exterior of the luminaire in order to maximize their field of view or optimize their detection capabilities.

However, there can be several drawbacks to mounting a sensor on the exterior of a luminaire. In the case of an outdoor luminaire, the sensor may be exposed to rain, pollutants, and other elements that can damage or degrade sensitive components used by the sensor. Furthermore, an exposed sensor may heighten the risk of theft. Additionally, if the sensor is positioned below or in front of the light source, the sensor may cast undesirable shadows.

The present disclosure sets forth luminaires embodying advantageous alternatives to existing luminaires, and that may address one or more of the challenges or needs mentioned herein, as well as provide other benefits and advantages.

SUMMARY

One aspect of the present disclosure provides a luminaire including a housing and a lens covering an opening formed in the housing. The luminaire may include a sensor which is disposed in the housing and configured to detect changes in an environment outside the housing. Also disposed in the housing may be a light source configured to emit light in a forward direction toward the lens. The sensor may be positioned rearward of at least a portion of the light source.

Another aspect of the present disclosure provides a luminaire including a housing and a lens covering an opening formed in the housing. A light source may be disposed in the housing and configured to emit light toward the lens. The light source may include a circuit board having a metal-free region.

An additional aspect of the present disclosure provides a luminaire including a housing and a lens covering an opening formed in the housing. A light disposed may be disposed in the housing and configured to emit light in a forward direction toward the lens. Also disposed in the housing may be a light pipe member. The light pipe member may be configured to transport ambient light present in an environment outside the housing to a location within the housing rearward of the circuit board.

BRIEF DESCRIPTION OF THE DRAWINGS

It is believed that the disclosure will be more fully understood from the following description taken in conjunction with the accompanying drawings. Some of the drawings may have been simplified by the omission of selected elements for the purpose of more clearly showing other elements. Such omissions of elements in some drawings are not necessarily indicative of the presence or absence of particular elements in any of the exemplary embodiments, except as may be explicitly delineated in the corresponding written description. Also, none of the drawings is necessarily to scale.

DETAILED DESCRIPTION

Figure 1:
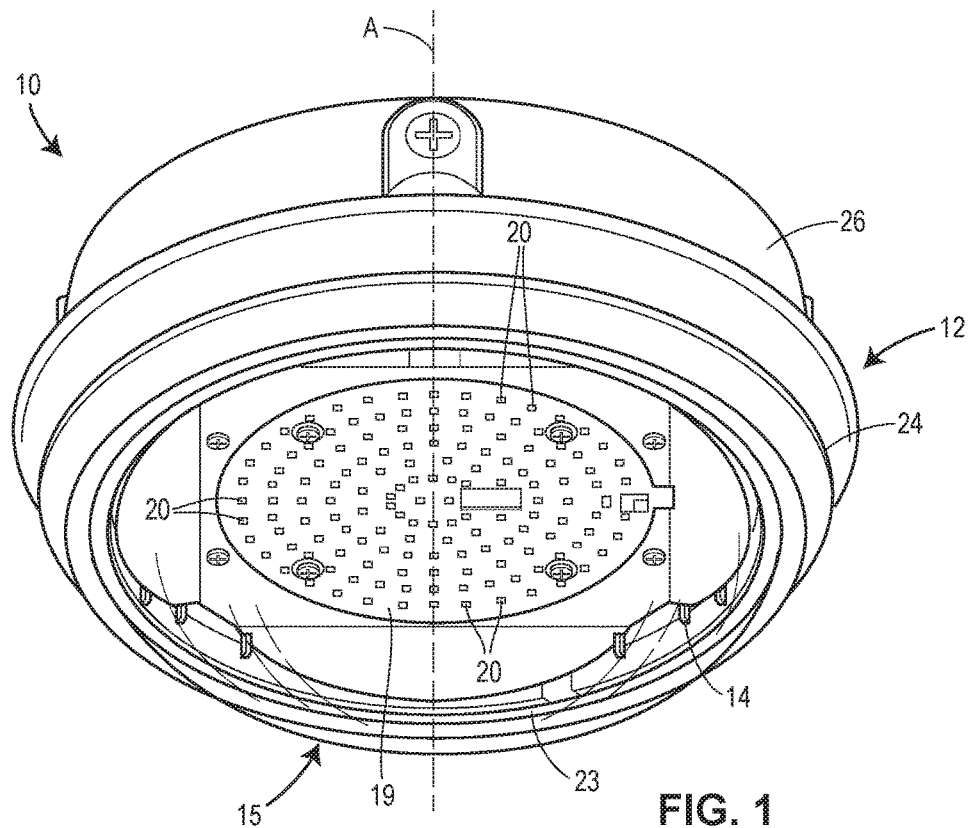
FIG. 1 is a perspective bottom view of an embodiment of a luminaire in accordance with principles of the present disclosure.
Figure 2:
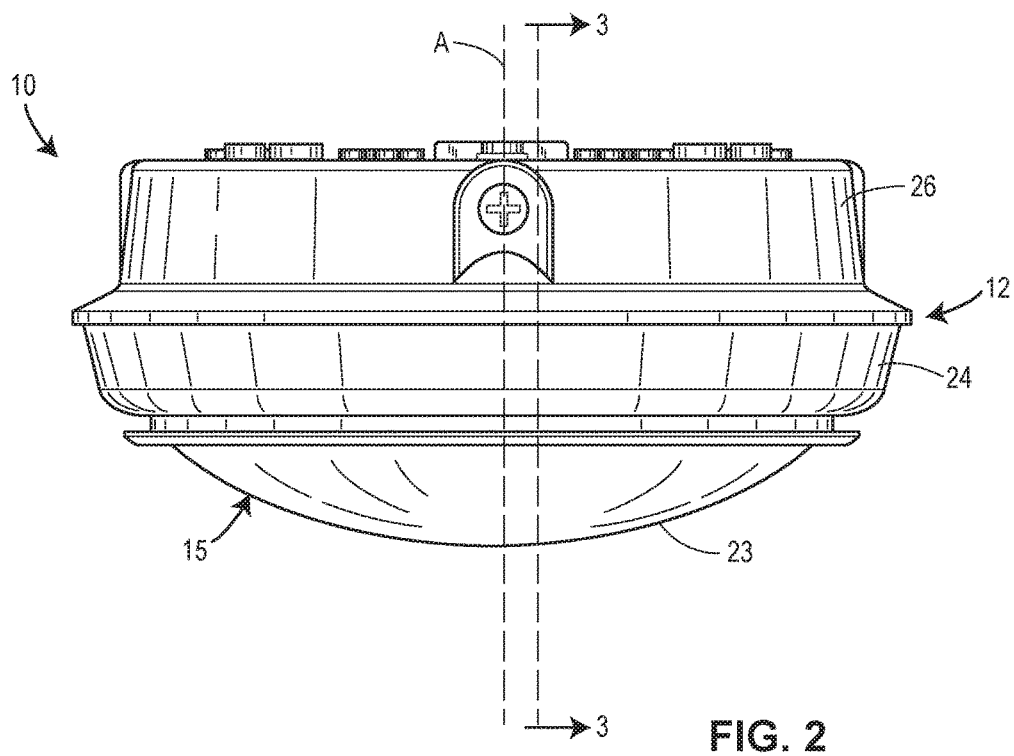
FIG. 2 is a side view of the embodiment of the luminaire illustrated in FIG. 1.

The present disclosure generally relates to configuring a luminaire with sensing capabilities without compromising the performance or integrity of the luminaire. The presently disclosed luminaires generally include a sensing assembly having one or more sensors and which is disposed within a housing of the luminaire and mounted above or rearward of a light source of the luminaire. As such, the sensing assembly may be protected within the housing but without obstructing light emitted by the light source. In certain embodiments, metallic or other electrically conducting elements incorporated into the light source may be arranged so as to limit their electromagnetic interference with the sensing assembly, thereby improving the detection capabilities of the sensing assembly. Also, in some embodiments, a light pipe member may be included for channeling or otherwise transporting ambient light rays from outside the luminaire to the sensing assembly positioned behind the light source.

Each of the foregoing components, and other components, of the luminaires at issue will now be described in more detail.

FIGS. 1-3B depict one embodiment of a lighting fixture or luminaire 10 constructed in accordance with principles of the present disclosure. The luminaire 10 is generally suitable for either outdoor use or indoor use. The luminaire 10 may, for example, be used in a parking garage, commercial building, roadway, tunnel, residential home or building, or other structure or environment. In some embodiments, the luminaire 10 may be associated with a lighting system or a portion thereof, such as, for example, a lighting system included or employed in a parking garage (or a floor or section of the parking garage), commercial building (or a portion thereof), roadway, tunnel, or other structure (or a portion thereof), residential home or building, or other indoor or outdoor space or environment. In some embodiments, such a lighting system may include a plurality of luminaires 10. In one version, the lighting system may include a plurality of uniformly constructed luminaires 10. In another version, the lighting system may include a plurality of luminaires 10 of different types, sizes, and/or shapes. Furthermore, the plurality of luminaires 10 may be connected to one another via a wired or wireless connection (e.g., such as to form a mesh network). Still further, such a lighting system can be interfaced with a control system configured to intelligently control the components of the lighting system. In such a situation, the luminaires 10 of the lighting system may be communicatively connected to and, once commissioned, controlled remotely by a central controller or similar device or component of the control system. As such, the luminaires 10 may transmit data, such as operating status, driver status, hardware information, occupancy data, daylight levels, temperature, power consumption, to the central controller (or similar device) and may receive, from the central controller (or similar device), operational instructions (e.g., turn on, turn off, dim, etc.) and/or other data (e.g., operational data from other luminaires 10).

In general, the luminaire 10 may include a housing 12, a light source 14 mounted within the housing 12, a lens 15 (e.g., a diffuser) connected to the housing 12 and covering the light source 14, and an electronics control assembly 16 and a sensing assembly 18 each being mounted within the housing 12. In the depicted version, the light source 14 includes a generally circular circuit board 19 with multiple light emitting diodes (LEDs) 20 each being configured to emit artificial light generally in a forward direction, or a downward direction depending on the orientation of the luminaire 10 relative to the ground, toward a rearwardly or upwardly facing portion of the interior surface 22 of the lens 15. The housing 12 may include a bottom part 24 and a top part 26, with the bottom part 24 being configured to face toward the ground or otherwise in a downward or forward direction when the luminaire 10 is installed. An opening 17 may be formed in the bottom part 24 of the housing 12 and may be centrally aligned with a longitudinal axis A of the luminaire 10. The lens 15 may extend partially or entirely across the opening 17 when attached to the bottom part 24 of the housing 12. In some embodiments, the bottom part 24 of the housing 12 and the top part 26 of the housing 12 may be separate components which are fastened or otherwise connected together to define an interior space 32 enclosed by the housing 12. In other embodiments, the bottom part 24 and the top part 26 may be integrally formed as a single, unitary structure.

Figure 3A:
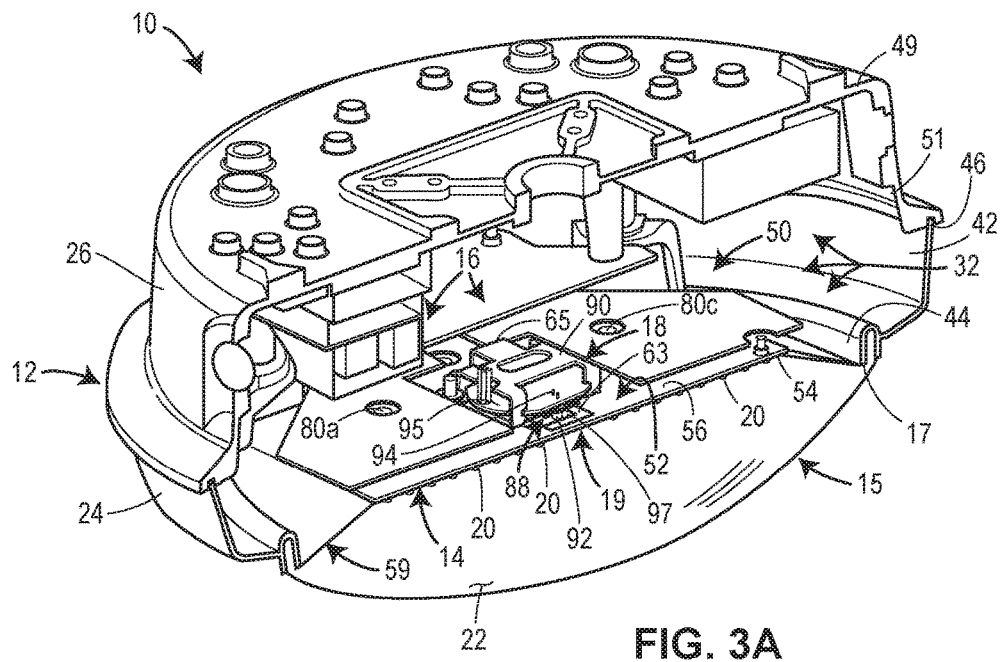
FIGS. 3A and 3B are cross-sectional perspective views of the luminaire illustrated in FIG. 2, taken along imaginary line 3-3 of FIG. 2.
Figure 3B:
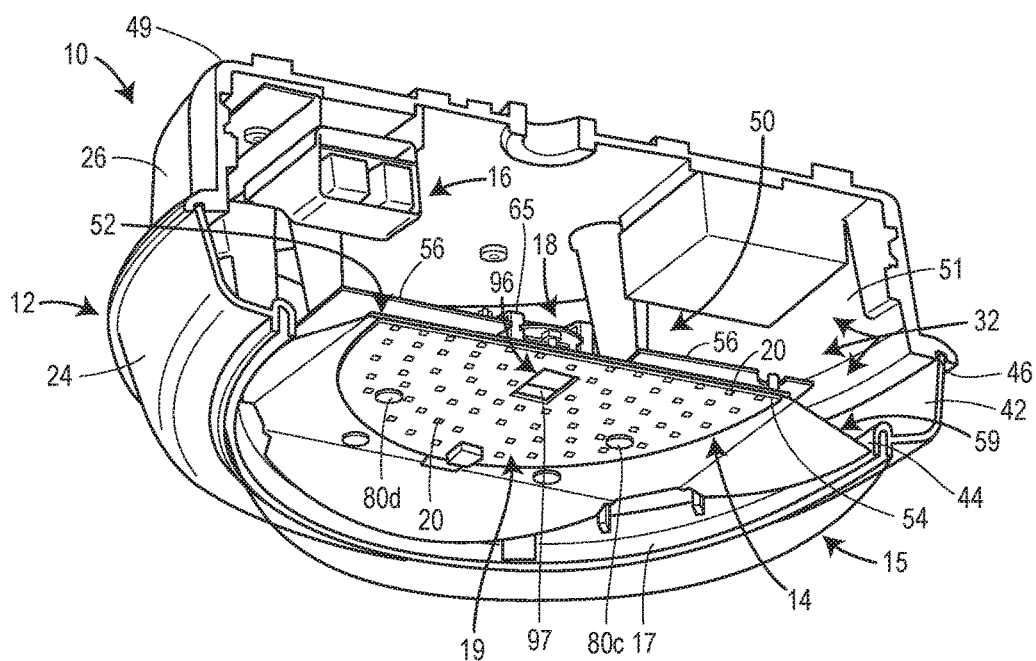

As shown in FIGS. 3A and 3B, the interior space 32 may contain the light source 14, the electronics control assembly 16, the sensing assembly 18, one or more mounting structures, and other internal components not explicitly illustrated such as, for example, electrical wiring, one or more communication modules (e.g., one or more antennae, receivers, and/or transmitters), one or more transformers, and/or other electrical components. Also, while not explicitly depicted, the electronics control assembly 16 may include one or more boards (e.g., one or more printed circuit boards and/or one or more user interface boards), one or more controllers (e.g., one or more microprocessors), and/or a one or more computer data storage units or memories. The electronics control assembly 16 and the sensing assembly 18 may be communicatively coupled by wiring or other means such that electrical signals can be sent and received therebetween. Furthermore, in some embodiments, the electronics control assembly 16 and the sensing assembly 18 may form a single unit and may, in some configurations, share a single circuit board.

With continued reference to FIGS. 3A and 3B, the housing 12 generally has a domed-shape and may be manufactured from any suitably rigid and/or durable material including, but not limited to, metal (e.g., die cast aluminum and/or stainless steel) and/or certain types of plastic. The bottom part 24 of the housing 12 may be generally cylindrical and possess annular or circumferential wall 42 that extends around the longitudinal axis A. A bottom end 44 of the annular wall 42 may define a perimeter of the opening 17; and a top end 46 of the annular wall 42 may be connected directly to the top part 26 of the housing 12. The top part 26 of the housing 12 may include a top wall 49 defining a closed end of the housing 12, and an annular or circumferential wall 51 that extends around the longitudinal axis A. The top wall 49 may include a mounting structure (e.g., a bracket, mounting plate, flexible cord, etc.) suitable for mounting or securing the housing 12, and thus the luminaire 10, to a wall, ceiling, or other surface.

Still referring to FIGS. 3A and 3B, a mounting assembly 50 may be disposed in the housing 12 and may be configured to connect and/or support various components of the luminaire 10. The mounting assembly 50 may include at least one support plate or bracket 52 and one or more fasteners or other connection members for rigidly connecting various components to the support plate 52. In the illustrated embodiment, the support plate 52 is integrally formed as a single, unitary structure. In alternative embodiments, the support plate 52 may be formed by multiple distinct structures which are rigidly connected to each other. In the present embodiment, the support plate 52 may be suspended from the top part 26 of the housing 12; however, in other embodiments, the support plate 52 may be supported by the bottom part 24 of the housing 12, or connected to both the bottom part 24 of the housing 12 and the top part 26 of the housing 12.

The support plate 52 may include a forwardly or downwardly facing surface 54 and a rearwardly or upwardly facing surface 56. The downwardly facing surface 54 of the support plate 52 may be positioned rearward of, or above depending on the orientation of the luminaire 10 relative to the ground, the opening 17 formed in the bottom part 24 of the housing 12 such that the downwardly facing surface 54 is spaced apart from the opening 17 by a vertical distance. As shown in FIGS. 3A and 3B, the light source 14 may be mounted on a central portion of the downwardly facing surface 54 of the support plate 52, and a generally ring-shaped reflector 59 may be mounted on an outer peripheral portion of the downwardly facing surface 54 of the support plate 52. So disposed, the reflector 59 may surround or circumscribe the light source 14, and may be configured to reflect wayward light emitted from the light source 14, thereby causing the light to exit the luminaire 10 in a more focused manner. In some embodiments, the reflector 59 may include a wall that is parallel to or otherwise non-perpendicular to the longitudinal axis A such that the reflector 59 spans at least or portion of, or the entirety of, the vertical separation distance between the downwardly facing surface 54 of the support plate 52 and the opening 17 formed in the bottom part 24 of the housing 12.

Fastening members 80a-d, such as screws, bolts, or other connection members, may be disposed through overlapping openings formed in the support plate 52 and the light source 14, and overlapping openings formed in the support plate 52 and the reflector 59, in order to secure the support plate 52, respectively, to the light source 14 and the reflector 59. Separate and offset from the openings for receiving the fastening members 80a-d, an opening 63 may be formed in a central part of the support plate 52 directly below and thus overlapping or aligned with a portion of the sensing assembly 18. As described below in more detail, the opening 63 may allow the sensing assembly 18 to see through or otherwise receive signals through the support plate 52 with minimal electromagnetic interference, and furthermore may overlap a metal-free region of the light source 14.

In some embodiments, a plurality of fins may protrude from the support plate 52 or another portion of the mounting assembly 50 to help dissipate heat generated by the light source 14 and/or the electronics control assembly 16. In this way, the mounting assembly 50 may also serve as a heat sink.

With continuing reference to FIGS. 3A and 3B, the sensing assembly 18 may be mounted rearward or above the upwardly facing surface 56 of the support plate 52. In the present embodiment, this is achieved by way of a bracket 65 which is fastened to the upwardly facing surface 56 of the support plate 52 and may be configured to cantilever a sensor 88, or multiple sensors, over (e.g., directly above or directly rearward) the opening 63 formed in the support plate 52. In other embodiments, the sensing assembly 18 may include a bracket or other connection member for suspending the sensor 88 from the top part 26 of the housing 12 such that the sensor 88 is positioned directly above or directly rearward of the opening 63.

In the illustrated embodiment, the sensor 88 is a microwave motion sensor (e.g., an active Doppler shift radio wave sensor) configured to detect motion within a pre-determined range or distance from the luminaire 10 by measuring or detecting infrared light radiating from objects in the pre-determined range of the luminaire 10. As shown in FIGS. 3A and 3B, the sensor 88 may include a body portion 90 and a lens portion 92 (e.g., a Fresnel lens) that is connected to and covers a bottom end of the body portion 90. The body portion 90 may include a plurality of prongs 94 that extend upwardly or rearwardly and are in electrical contact with a circuit board 95 (e.g., a printed circuit board) in order facilitate electronic communication between the sensor 88 and, for example, the electronics control assembly 16.

While the sensor 88 of the present embodiment takes the form of the microwave motion sensor, the motion sensor 88 can alternatively take the form of a passive infrared motion sensor, an ultrasonic motion sensor, a tomographic motion sensor, or another type of motion sensor configured to detect motion within a pre-determined range or distance from the luminaire 10. In still further alternative embodiments, the sensor 88 may be configured as a light intensity sensor, temperature sensor, or any other type of sensor that facilitates operation of the luminaire 10 and/or monitoring of its surroundings. Furthermore, the sensor 88 is not limited to the configuration shown in FIGS. 3A and 3B; other versions of the sensor 88 may vary in shape, size, location, and/or construction. Moreover, fewer, or different components for the sensor 88 are envisioned. For example, the body portion 90 and the lens portion 92 can be integrally formed.

Figure 6:
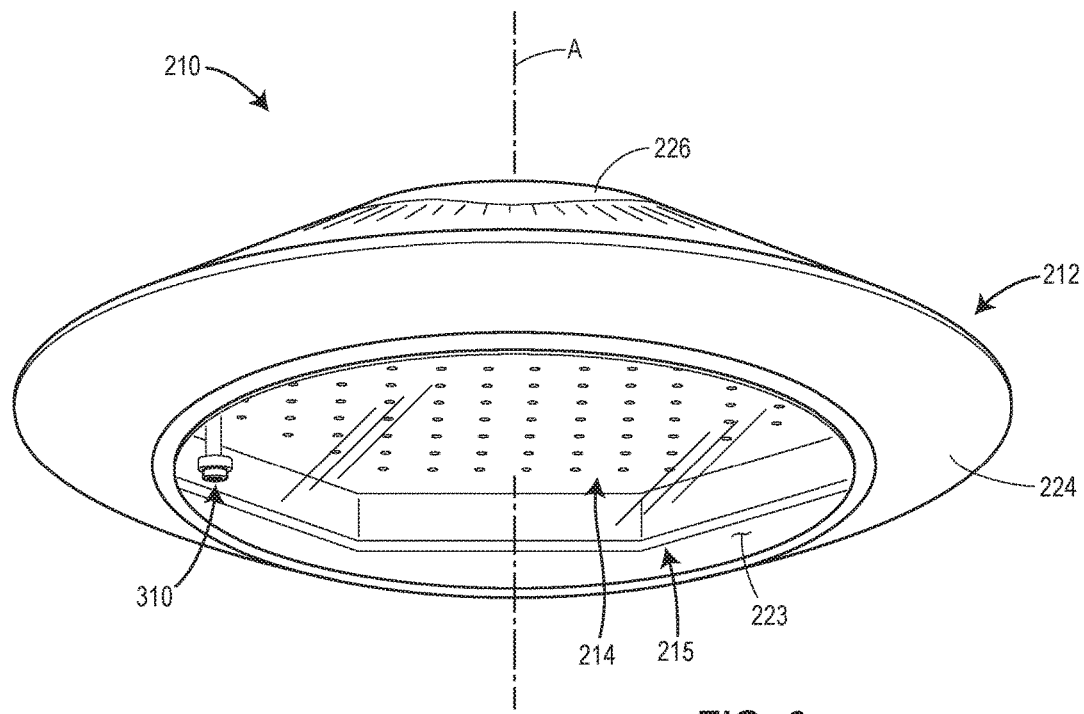
FIG. 6 is a perspective bottom view of another embodiment of a luminaire in accordance with principles of the present disclosure.
Figure 7:
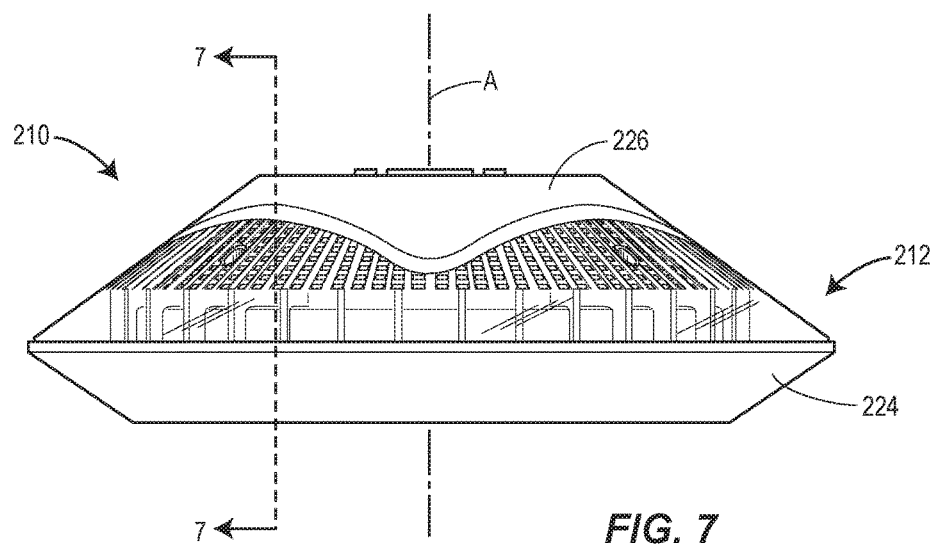
FIG. 7 is a side view of the embodiment of the luminaire illustrated in FIG. 6.

Referring back to FIG. 1, the lens 15 may generally have the shape of an inverted dome or bowl with a curved forwardly or downwardly facing exterior surface 23. In other embodiments, such as the one shown in FIG. 6, the lens may have a generally planar shape with at least a portion of the exterior surface being flat. The lens 15 may be generally translucent and configured to diffusely transmit and/or diffusely reflect light emitted from the light source 14. In some embodiments, the lens 15 may diffusively transmit approximately (e.g., ±10%) 80% of the light from the light source 14, and diffusively reflect the remaining approximately (e.g., ±10%) 20% of the light from the light source 14. By diffusively transmitting light emitted from the LEDs 20, the lens 15 may provide a scattering effect that substantially reduces glare and/or creates the effect of a uniformly luminous surface, which is generally considered more aesthetically pleasing than the distinct points of light that may be created by the LEDs 20. The lens 15 may be constructed of any suitable material including, but not limited to, plastic (e.g., acrylic or polycarbonate) and/or glass, and this material may be chosen depending on the desired amount of light scattering.

In some embodiments, an interior surface 22 of the lens 15 and/or the exterior surface 23 of the lens 15 may be textured in order to diffusively transmit and/or diffusively reflect the light emitted from the light source 14. Additionally, in some embodiments, the lens 15 may be constructed of a material which does not polarize the light emitted from the light source 14.

The LEDs 20 may be mounted in a pattern on a forwardly or downwardly facing surface of the circuit board 19. In addition to or as an alternative to the LEDs 20, the light source 14 may include other light emitting elements such as, for example, one or more incandescent bulbs, one or more fluorescent bulbs, one or more high-intensity discharge bulbs, and/or one or more plasma bulbs. The LEDs 20 may receive power from an external source of electricity (not illustrated). In general, the electronics control assembly 16 and/or circuit board 19 may be configured to control the manner or rate with which power is supplied to the LEDs 20 from the external source of electricity. In some embodiments, the electronics control assembly 16 and/or the circuit board 19 may be responsible for automatically dimming or turning ON/OFF various LEDs 20 in response to signals received from the sensing assembly 18 and/or programmable instructions stored in a computer memory device onboard the luminaire 10 or received wirelessly or through wired connection by the luminaire 10.

In some embodiments, each of the LEDs 20 may be integrally formed with a primary optic or lens that provides, for example, a lambertian light distribution. Additionally, in some embodiments, each of the primary optics or lenses may be covered by a secondary optic or lens. In such embodiments, the lens 15 may be referred to as a tertiary optic or lens.

Figure 4A:
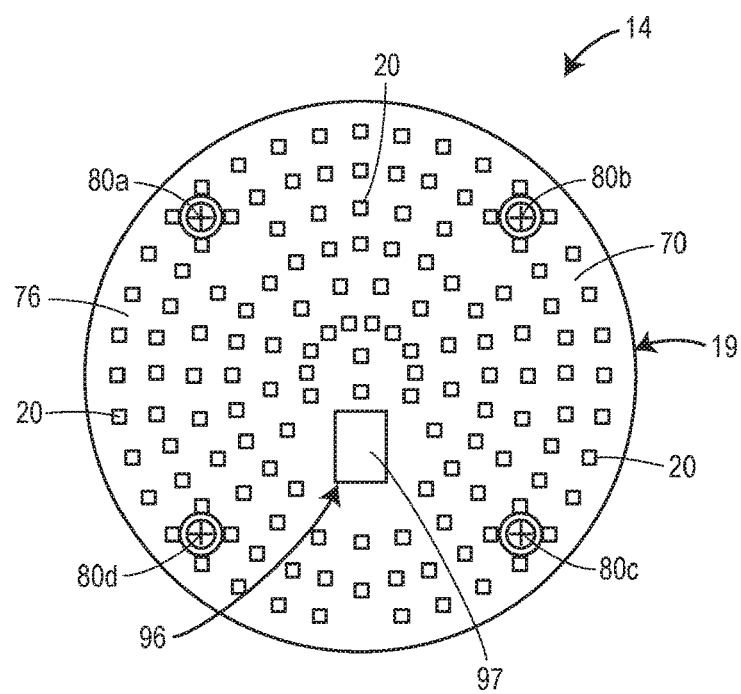
FIG. 4A is a bottom plan view of a light source included in the luminaire depicted in FIGS. 1-3B.
Figure 4B:
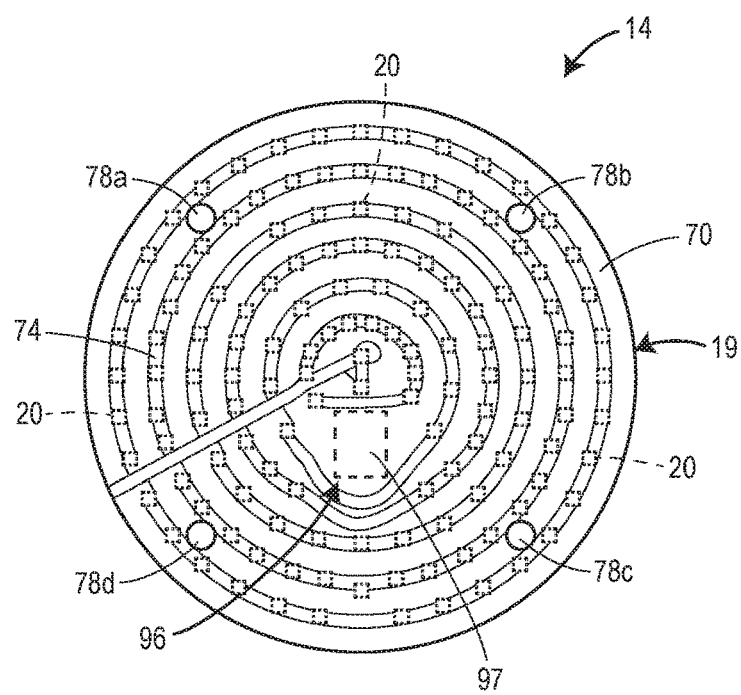
FIGS. 4B is a top plan view of the light source shown in FIG. 4A.

Turning to FIGS. 4A and 4B, the circuit board 19 may possess a generally planar or flat construction with a circular outer perimeter. In some embodiments, the circuit board 19 may have an outer diameter, or other outer dimension, within a range between approximately (e.g., ±10%) 6-36 inches, or in range between approximately (e.g., ±10%) 6-30 inches, or in range between approximately (e.g., ±10%) 6-24 inches, or in range between approximately (e.g., ±10%) 6-18 inches, or in range between approximately (e.g., ±10%) 10-18 inches, or equal to or greater than approximately (e.g., ±10%) 6 inches, or equal to or greater than approximately (e.g., ±10%) 8 inches, or equal to or greater than approximately (e.g., ±10%) 10 inches, or equal to or greater than approximately (e.g., ±10%) 12 inches. The circuit board 19, however, is not limited to having a circular shape and may, in alternative embodiments, have a rectangular, square, triangular, irregular, or other suitable shape.

In general, the circuit board 19 may be configured to mechanically support and electrically connect various electronic components, including the LEDs 20. In some embodiments, the circuit board 19 may be a printed circuit board, such as, for example, a single-side, double-sided, or multi-layer printed circuit board. The circuit board 19 may include an electrically non-conductive substrate member 70 and a plurality of electrically conductive elements 72 mounted on and/or embedded within the electrically non-conductive substrate member 70. The electrically conductive elements 72 may be electrically coupled to the LEDs 20 and supply the LEDs 20 with electricity from the external source. In some embodiments, the electrically conductive elements 72 may be electrically conductive tracks, pads, or other features which are etched from a copper or other metal sheet that is laminated onto the non-conductive substrate member 70. In other embodiments, the electrically conductive elements 72 may be wires made of copper or another metal material.

The electrically non-conductive substrate member 70 may be a composite material including a matrix material (e.g., an epoxy resin), a reinforcement material (e.g., woven or non-woven glass fibers), and/or a filler (e.g., a ceramic). Furthermore, while the electrically non-conductive substrate member 70 of the present embodiment is single, unitary structure, in other embodiments the electrically non-conductive substrate member 70 may be formed by multiple, distinct structures which are fastened, adhered, or otherwise connected to each other.

Still referring to FIGS. 4A and 4B, the electrically non-conductive substrate member 70 may include a rearwardly or upwardly facing surface 74 and a forwardly or downwardly facing surface 76. The LEDs 20 may be mounted on (e.g., fastened to, adhered to, or soldered to) the downwardly facing surface 76 of the electrically non-conductive substrate member 70. A plurality of fastener openings 78a-d may be formed in the electrically non-conductive substrate member 70, and each may extend between the upwardly facing surface 74 and the downwardly facing surface 76 of the electrically non-conductive substrate member 70. Furthermore, each of the fastener openings 78a-d may overlap with a corresponding opening formed in the support plate 52 when the circuit board 19 is mounted on the support plate 52. Moreover, each of the fastener openings 78a-d may receive a respective one of the fasteners 80a-d (shown in FIG. 4A but not FIG. 4B) for securing the circuit board 19 to the support plate 52.

Referring back to FIGS. 3A and 3B, the light source 14 is attached below the sensing assembly 18 and thus has the potential to obstruct or interfere with electromagnetic signals (or other signals) from the outside environment. For instance, any metallic elements included in the light source 14, including, for example, the LEDs 20 and/or the electrically conductive elements 72, and mounted in the vicinity of the sensor 88 have the potential to distort or introduce noise to measurements made by the sensor 88. To address this issue, the circuit board 19 may be configured with a metal-free region 96. The metal-free region 96 may be completely devoid of any metallic elements and may be positioned below and overlapping or aligned with a portion of, or the entirety of, the sensing assembly 18. As such, at least a portion of, or the entirety of, the sensing assembly 18 may be positioned directly rearward of, or directly above depending on the orientation of the luminaire 10 relative to the ground, the metal-free region 96 of the circuit board 19 and thus configured to receive signals from the outside environment that propagate through the metal-free region 96 of the circuit board 19 with little or no electromagnetic interference. In some embodiments, an imaginary linear axis that is parallel to the longitudinal axis A of the luminaire 10, or the longitudinal axis A itself, may pass through both the sensing assembly 18 and the metal-free region 96 of the circuit board 19. Furthermore, in some embodiments, the sensor 88 may be positioned directly rearward of or above and/or aligned or overlapping with the metal-free region 96. In such embodiments, an imaginary linear axis that is parallel to the longitudinal axis A of the luminaire 10, or the longitudinal axis A itself, may pass through both the sensor 88 and the metal-free region 96 of the circuit board 19. However, in alternative embodiments, the portion of the sensing assembly 18 which is aligned or overlapping with the metal-free region 96 may not include the sensor 88.

The metal-free region 96 of the circuit board 19 may be achieved through various configurations. At a minimum, the metal-free region 96 of the circuit board 19 should be free of any of the electrically conductive elements 72 and any of the LEDs 20 (or other light generating elements). In the embodiment illustrated in FIGS. 1-4B, the metal-free region 96 of the circuit board 19 is defined by an opening 97 extending between the upwardly facing surface 74 and the downwardly facing surface 76 of the electrically non-conductive substrate member 70. As shown in FIGS. 3A and 3B, at least a portion of the sensing assembly 18 may be spaced apart from the opening 97 by a vertical distance with empty space existing between the sensing assembly 18 and the opening 97. This vertical distance may be within a range between approximately (e.g., ±10%) 0.2-6 inches, or within a range between approximately (e.g., ±10%) 0.2-3 inches, or within a range between approximately (e.g., ±10%) 0.2-1 inches, or equal to or less than approximately (e.g., ±10%) 6 inches, or equal to or less than approximately (e.g., ±10%) 3 inches, or equal to or less than approximately (e.g., ±10%) 1.5 inches, or equal to or less than approximately (e.g., ±10%) 1 inch. In some embodiments, the body portion 90 and/or the lens portion 92 of the sensor 88 may be positioned within the opening 97. In such embodiments, the lens portion 92 or the bottom terminal end of the sensor 88 may be level with or otherwise not protrude beyond the LEDs 20, so that that the sensor 88 does not obstruct the light emitted by the LEDs 20.

In operation, the sensing assembly 18 is, by virtue of being positioned above and overlapping or aligned with the metal-free region 96 of the circuit board 19, positioned to accurately detect motion, whether from a person, an animal, a vehicle, or another object, within a pre-determined range of or distance from the luminaire 10. The way in which the sensing assembly 18 detects motion is known in the art, so will not be described herein. The pre-determined range or distance can be 50 feet, 100 feet, or some other distance set by a local controller included as part of the electronics control assembly 16 within the housing 12, a remote or central controller via wireless or wired communication with the electronics control assembly 16, and/or a user of the luminaire 10 or the control system described above.

In any event, when the sensing assembly 18 detects motion (i.e., occupancy) within the pre-determined range, this information is communicated as an electric signal to the components of the electronics control assembly 16 within the housing 12. The electronics control assembly 16 can, responsive to this information, subsequently cause the light source 14 to emit light, emit no light, emit more light, or emit less light. Alternatively or additionally, the components of the electronics control assembly 16 (e.g., via wireless antennae) can transmit this information to the central controller and/or other luminaires 10. Based on this information, other luminaires 10, particularly adjacent luminaires 10, can be controlled accordingly (e.g., turned on, turned off, dimmed, or brightened).

Conversely, when the sensing assembly 18 does not detect motion (i.e., no occupancy) within the pre-determined range, this information is similarly communicated to the electronics control assembly 16. If the light source 14 is emitting light at the time of this detection (of no motion), the electronics control assembly 16 can, responsive to this information, subsequently cause the light source 14 to emit less light (i.e., dim) or no light at all. Alternatively or additionally, the components of the electronics control assembly 16 (e.g., via wireless antennae) can transmit this information to the central controller and/or other luminaires 10. Based on this information, other luminaires 10, particularly adjacent luminaires 100, can be controlled accordingly (e.g., turned off, turned on, or dimmed).

Figure 5A:
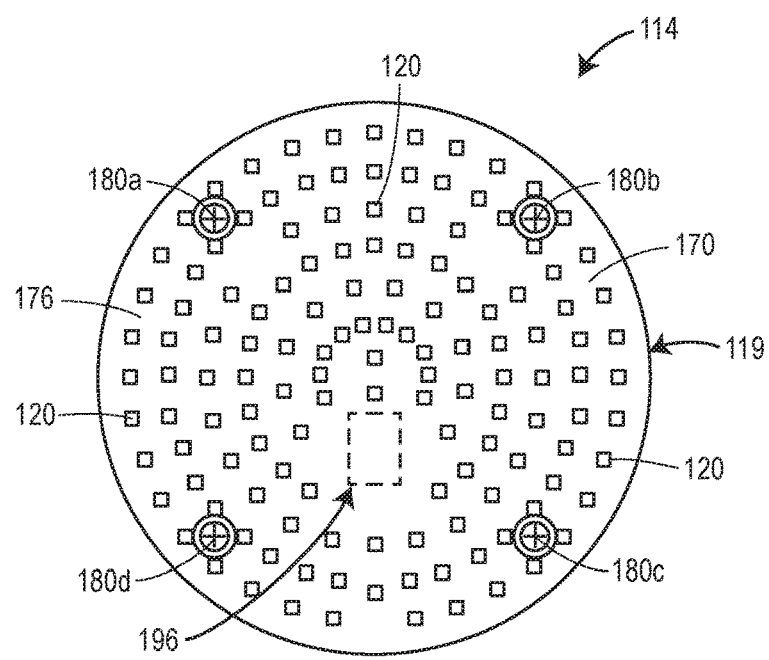
FIG. 5A is a bottom plan view of an alternative embodiment of the light source.
Figure 5B:
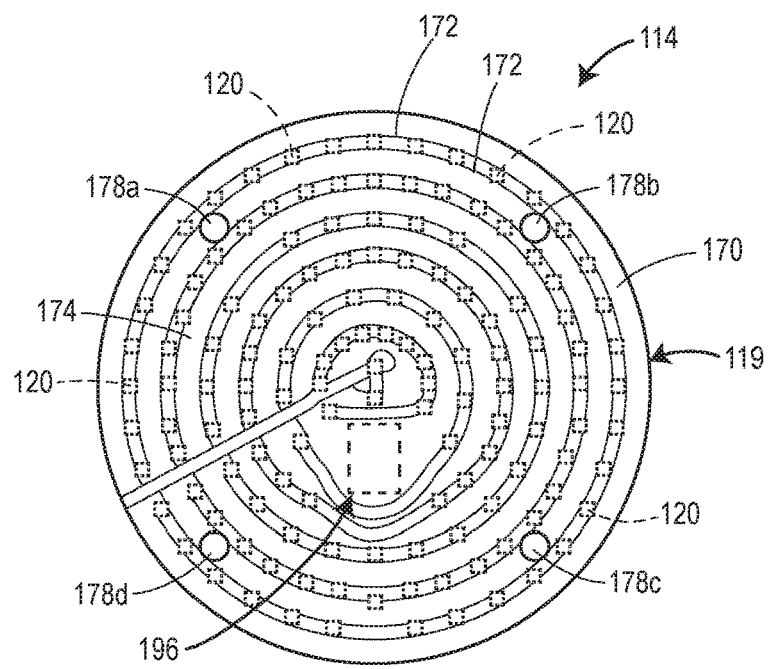
FIGS. 5B is a top plan view of the light source shown in FIG. 5A.

While the metal-free region of the circuit board illustrated in FIGS. 1-4B is defined by a through hole formed in the electrically non-conductive substrate member, the metal-free region may be achieved through other configurations as well. FIGS. 5A and 5B illustrate another embodiment of a circuit board 119 where a metal-free region 196 is defined by a portion of an electrically non-conductive substrate member 170 which is devoid of metallic elements. Elements of the circuit board 119 depicted in FIGS. 5A and 5B which are similar to those shown in FIGS. 1-4B are designated by the same reference numeral, incremented by 100. A description of many of these elements is abbreviated or even eliminated in the interest of brevity. Furthermore, the circuit board 119 may be installed in the luminaire 10 in a similar manner as the circuit board 19.

The boundary or perimeter of the metal-free region 196 of the circuit board 119 is represented by dotted lines in FIGS. 5A and 5B. Within this boundary, the electrically non-conductive substrate member 170 is free of any of the electrically conductive elements 172 and any of the LEDs 120 (or other light generating elements). At least a portion of the sensing assembly 18 (which in some embodiments may include the sensor 88) may be positioned directly rearward of, or directly above depending on the orientation of the luminaire 10 relative to the ground, the metal-free region 196 of the circuit board 119 and thus configured to receive signals from the outside environment that propagate through the metal-free region 196 of the circuit board 119. Due to the absence of metallic elements in this portion the circuit board 119, such signals may propagate through the electrically non-conductive substrate member 170 with minimal interference, electromagnetic or otherwise.

The metal-free region 96 depicted in FIGS. 4A and 4B, as well as the metal-free region 196 shown in FIGS. 5A and 5B, has a rectangular shape. However, in other embodiments, the metal-free region 96 or 196 may be shaped differently, including, for example, having a square, triangular, circular, semi-circular, oval, irregular, or any other suitable shape. In terms of size, the metal-free region 96 or 196 may vary depending on the position of the sensor 88 relative to the circuit board 19 or 119, the sensitivity of the sensor 88, among other factors. When viewed from below in a plan view (as shown in FIGS. 4A and 5A), the metal-free region 96 or 196 may cover an area within a range between approximately (e.g., ±10%) 0.5-6 inches, or an area within a range between approximately (e.g., ±10%) 0.5-3 inches, or an area within a range between approximately (e.g., ±10%) 0.5-2 inches, or an area within a range between approximately (e.g., ±10%) 0.5-1.5 inches, or an area within a range between approximately (e.g., ±10%) 0.5-1 inch, or an area equal to or greater than approximately (e.g., ±10%) 0.5 inches, or an area equal to or greater than approximately (e.g., ±10%) 0.75 inches, or an area equal to or greater than approximately (e.g., ±10%) 1.0 inches, or an area equal to or greater than approximately (e.g., ±10%) 1.5 inches, or an area equal to or greater than approximately (e.g., ±10%) 2 inches, or an area equal to or greater than approximately (e.g., ±10%) 3 inches. In at least some embodiments, when viewed from below in a plan view (as shown in FIGS. 4A and 5A), the metal-free region 96 or 196 may cover an area that is greater than the area covered by any one of the fastener openings 78a-d or 178a-d.

Turning to FIGS. 6-9, illustrated is another embodiment of a luminaire 210. In at least some of the foregoing embodiments of the luminaire, artificial light reflected by the interior surface of the lens may be allowed to strike the sensor located above the light source. In certain situations, such as when the sensor is intended to detect the intensity (e.g., brightness) of ambient light present in the outside environment, allowing artificial light from the light source to strike the sensor may result in inaccurate measurements of the ambient lighting levels by the sensor. The luminaire 210 described below addresses this issue by including a light pipe assembly 310 configured to transport or channel ambient light rays from the outside environment directly to the sensor located above or rearward of the light source.

Though differences may exist in their size or shape, many of the elements of the luminaire 210 are similar, at least in function, to elements included in the luminaire 10. Such elements of the luminaire 210 are designated by the same reference numeral as their counterpart element in the luminaire 10, incremented by 200. A description of many of these elements is abbreviated or even eliminated in the interest of brevity.

Figure 8A:
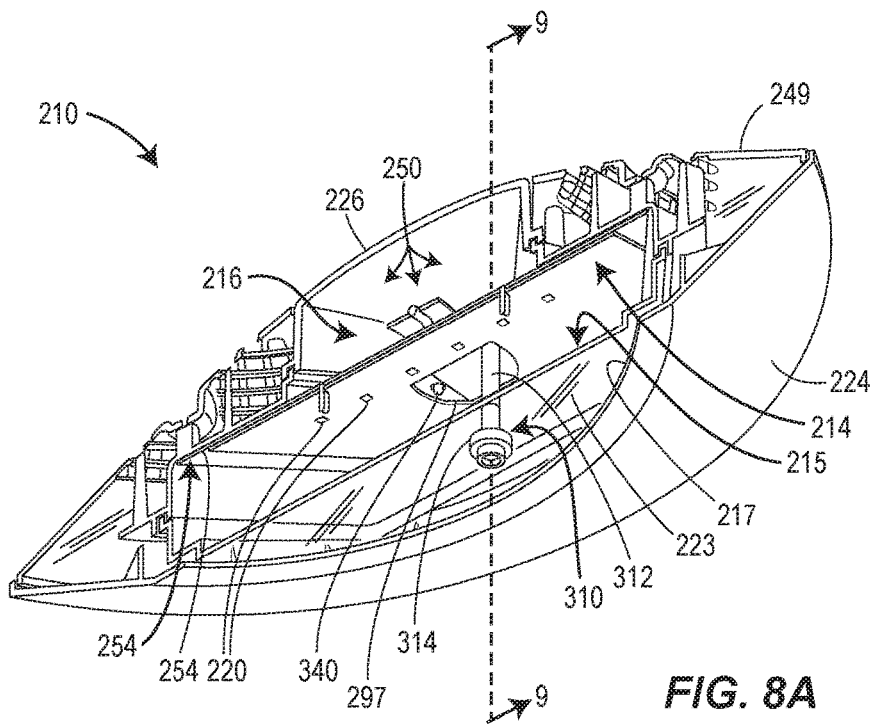
FIGS. 8A and 8B are cross-sectional perspective views of the luminaire illustrated in FIG. 7, taken along imaginary line 8-8 of FIG. 2.
Figure 8B:
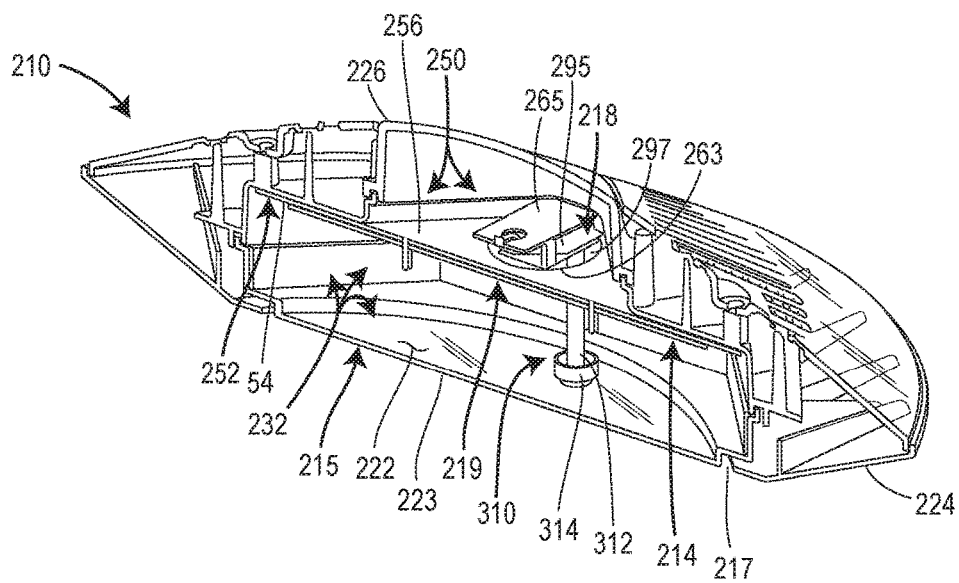
Figure 9:
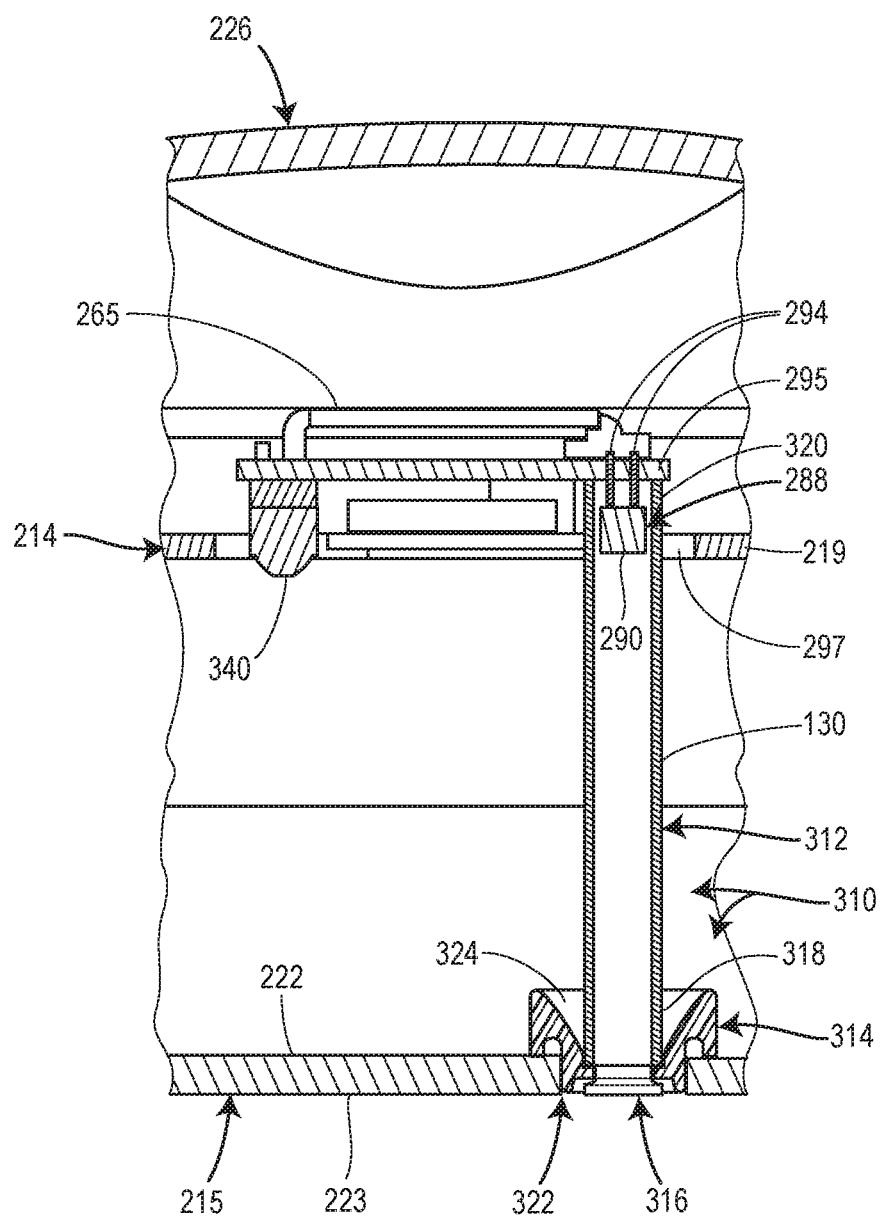
FIG. 9 is a cross-sectional side view of the light pipe assembly illustrated in FIG. 8A, taken along imaginary line 9-9.

Referring to FIGS. 8A, 8B, and 9, the light pipe assembly 310 may include a tubular light pipe member 312, a collar member 314 disposed around an exterior of the tubular light pipe member 312, and a lens 316. In some embodiments, the tubular light pipe member 312 may be a hollow cylinder extending along a linear axis. In other embodiments, the tubular light pipe member 312 may be a hollow, elongate structure that extends along a curved or otherwise non-linear axis. In still further alternative embodiments, the light pipe member 312 may be a solid (i.e., non-hollow) member and may have an interior that is made of a light transmissive material, such as plastic or glass, for example.

The light pipe member 312 may include a first or light entry end 318 and a second end 320. The light pipe member 312 may extend through an opening 297 formed in the circuit board 219 such that the light entry end 318 is disposed below or forward of the circuit board 219 and the second end 320 is disposed above or rearward of the circuit board 219.

As shown in FIG. 9, the light entry end 318 may be axially aligned with an opening 322 formed in the lens 215 such that ambient light rays can pass through the lens 215 and into the light entry end 318 of the light pipe member 312. In some embodiments, such as the one shown in FIG. 9, the light entry end 318 of the light pipe member 312 may extend partially into the opening 322 in the lens 215. In alternative embodiments, the light entry end 318 of the light pipe member 312 may extend entirely through the opening 322. In still further alternative embodiments, the light entry end 318 of the light pipe member 312 may be positioned directly above or rearward of the opening 322. Also, in some embodiments, the opening 322 in the lens 215 may be omitted.

In some embodiments, the opening 322 in the lens 215 may be circular and have a diameter equal to approximately (e.g., ±10%) 0.4375 inches, or equal to or less than approximately (e.g., ±10%) 0.5 inches, or equal to or less than approximately (e.g., ±10%) 1 inch.

In the illustrated embodiment, the light entry end 318 of the light pipe member 312 has an opening and the second end 320 of the light pipe member 312 includes an opening. As shown in FIG. 9, the body portion 290 of the sensor 288 may be disposed in the second end 320 of the light pipe member 312, and the prongs 294 may extend outwardly through the opening formed in the second end 320. In alternative embodiments, the body portion 290 of the sensor 288 may be positioned outside of the light pipe member 312 directly above or rearward of the opening in the second end 320 of the light pipe member 312, such that the ambient light rays transmitted through the light pipe member 312 are emitted from the second end 320 and onto the body portion 290 of the sensor 288. In still further alternative embodiments, only the light entry end 318 may have an opening and the second end 320 may be closed off by a wall. In such alternative embodiments, at least the body portion 290 of the sensor 288 may be positioned within the second end 320 of the light pipe member 312.

The light pipe member 312 may be constructed of an opaque material, or at least coated with an opaque material, such that the light pipe member 312 prevents artificial light from the light source 215 from passing through the wall of the light pipe member 312 and reaching the sensor 288. Accordingly, only light, such as ambient light rays, that enters the light pipe member 312 through the light entry end 318 may be able to strike the sensor 288. In some embodiments, in addition to being opaque, the material used to construct or coat the light pipe member 312 may be reflective.

With continued reference to FIG. 9, the collar member 314 may be disposed around the light entry end 318 of the light pipe member 312 and may connect the light entry end 318 of the light pipe member 312 to the lens 215. The collar member 314 may include an annular wall 324, a bottom portion of which may be positioned in the opening 322 formed in the lens 215. The exterior surface of the light entry end 318 of the light pipe member 312 may sealingly or otherwise snugly engage the interior surface of the annular wall 324 of the collar member 314, such that artificial light from the light source 214 is prevented or inhibited from passing through the interface between the exterior surface of the light entry end 318 of the light pipe member 312 and the interior surface of the annular wall 324 of the collar member 314. In some embodiments, an O-ring may be fitted around the light entry end 318 of the light pipe member 312 to ensure a snug fit between the light entry end 318 of the light pipe member 312 and the annular wall 324 of the collar member 314. Furthermore, since a bottom portion of the annular wall 324 of the collar member 314 may be positioned in the opening 322 in the lens 215, the annular wall 324 may block any artificial light internally reflected within the lens 215 from entering the light entry end 318 of the light pipe member 312.

The lens 316 may cover the opening formed in the light entry end 318 of the light pipe member 312. In some embodiments, the lens 316 may be configured to direct the ambient light rays toward, or focus the ambient light rays on, the sensor 288. The exterior surface of the lens 316 may be level or substantially level with the exterior surface 223 of the lens 215 so that the bottom of the luminaire 210 has the appearance of generally smooth surface. Also, in some embodiments, the bottom portion of the annular wall annular wall 324 of the collar member 314 may be level or substantially level with the exterior surface 223 of the lens 215.

In operation, the sensor 288 is, by virtue of being disposed in or immediately above the second end 320 of the light pipe member 312, positioned to accurately measure ambient lighting conditions outside of the luminaire 210 without being substantially influenced by artificial light emitted light source 214. In some embodiments, the sensor 288 may be configured to detect an intensity (e.g., brightness) of the ambient light rays in a visible spectrum. When the sensor 288 detects an intensity of ambient light rays within the pre-determined range, this information is communicated as an electric signal to the components of the electronics control assembly 216 within the housing 212. The electronics control assembly 216 can, responsive to this information, subsequently cause the light source 214 to emit light or to emit more light. Alternatively or additionally, the components of the electronics control assembly 216 (e.g., via wireless antennae) can transmit this information to the central controller and/or other luminaires 210. Based on this information, other luminaires 210, particularly adjacent luminaires 210, can be controlled accordingly (e.g., turned on, turned off, or dimmed).

In alternative embodiments, the sensor 288 may be configured as a motion sensor, a temperature sensor, or any other type of sensor that facilitates operation of the luminaire 210 and/or monitoring of its surroundings.

Referring to FIG. 9, in addition to the sensor 288, the sensing assembly 218 may include a motion sensor 340. Similar to the sensor 88 described above in connection with FIGS. 1-4B, the motion sensor 340 may be positioned above or rearward of and/or aligned or overlapping with the opening 297 in the circuit board 219. The foregoing description of the structure and operation of the sensor 88 applies equally to the motion sensor 340.

Accordingly, the embodiments of the luminaire disclosed herein advantageously provide a sensing assembly which is hidden, and thus protected, within the housing of the luminaire. Furthermore, the sensing assembly is arranged so that it does not obstruct light emitted by the light source of the luminaire. Other benefits and advantages are also possible and will be apparent to a person of ordinary skill who reviews the present disclosure.

As used herein, the upward direction refers to any direction generally extending away from the bottom part of the luminaire toward the top part of the luminaire, and is not limited to a direction that is oriented perpendicularly relative to the surface of the Earth. As used herein, the downward direction refers to any direction generally extending away from the top part of the luminaire toward the bottom part of the luminaire, and is not limited to a direction that is oriented perpendicularly relative to the surface of the Earth.

Furthermore, it is noted that the construction and arrangement of the luminaire and its various components and assemblies as shown in the various exemplary embodiments is illustrative only. Although only a few embodiments of the subject matter at issue have been described in detail in the present disclosure, those skilled in the art who review the present disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed herein. For example, elements shown as integrally formed may be constructed of multiple parts or elements, and vice versa. Also, the position of elements may be reversed or otherwise varied, and the nature or number of discrete elements or positions may be altered or varied. Accordingly, all such modifications are intended to be included within the scope of the present disclosure as defined in the appended claims. Furthermore, the order or sequence of any process or method steps may be varied or re-sequenced according to alternative embodiments. Other substitutions, modifications, changes and omissions may be made in the design, operating conditions and arrangement of the various exemplary embodiments without departing from the scope of the present disclosure.

What is claimed is:

1. A luminaire comprising:
   a housing;
   a sensing assembly disposed in the housing and configured to detect changes in an environment outside of the housing;
   a lens covering an opening formed in the housing; and
   a light source disposed in the housing and configured to emit light in a forward direction toward the lens, wherein the sensing assembly is positioned rearward of at least a portion of the light source.

2. The luminaire of claim 1, the light source including a circuit board and a plurality of light emitting diodes (LEDs) mounted on the circuit board.

3. The luminaire of claim 2, the circuit board including a non-conductive substrate and a plurality of conductive elements for supplying electricity to the LEDs.

4. The luminaire of claim 3, at least a portion of the sensing assembly being positioned rearward of and aligned with a metal-free region of the circuit board.

5. The luminaire of claim 4, the metal-free region of the circuit board being defined by an opening formed in the non-conductive substrate.

6. The luminaire of claim 4, the metal-free region of the circuit board being defined by a portion of the circuit board that is free of any of the plurality of conductive elements.

7. The luminaire of claim 6, an area covered by the metal-free region of the circuit board when viewed in a plan view is greater than or equal to 0.5 square inches.

8. The luminaire of claim 4, the sensing assembly including a sensor configured to detect motion within a predetermined distance from the luminaire.

9. The luminaire of claim 2, comprising a light pipe member disposed in the housing and configured to transport ambient light rays present in the environment to the sensing assembly, the light pipe member having a light entry end disposed forward of the circuit board and a second end disposed rearward of the circuit board, at least a portion of the sensing assembly being positioned to receive the ambient light rays from or within the second end of the light pipe member.

10. The luminaire of claim 9, the light entry end of light pipe member extending at least partially through an opening formed in the lens.

11. The luminaire of claim 9, the light pipe member including a hollow cylinder.

12. The luminaire of claim 9, the sensing assembly including a sensor configured to detect an intensity of the ambient light rays.

13. A luminaire comprising:
    a housing;
    a lens covering an opening formed in the housing; and
    a light source including a circuit board disposed in the housing and being configured to emit light toward the lens, wherein the circuit board includes a metal-free region.

14. The luminaire of claim 13, wherein an area covered by the metal-free region of the circuit board when viewed in a plan view is greater than or equal to 0.5 square inches.

15. The luminaire of claim 14, the metal-free region of the circuit board being defined by an opening formed in the non-conductive substrate.

16. The luminaire of claim 14, the metal-free region of the circuit board being defined by a portion of the circuit board that is free of any of the plurality of conductive elements.

17. The luminaire of claim 14, comprising a sensing assembly disposed in the housing and configured to detect changes in an environment outside of the housing, wherein at least a portion of the sensing assembly is positioned rearward of and aligned with the metal-free region.

18. A luminaire comprising:
    a housing;
    a lens covering an opening formed in the housing;
    a light source including a circuit board disposed in the housing and being configured to emit light in a forward direction toward the lens; and
    a light pipe member being disposed in the housing and configured to transport ambient light rays present in an environment outside of the housing to a location within the housing rearward of the circuit board.

19. The luminaire of claim 18, the light pipe member having a light entry end disposed forward of the circuit board and a second end disposed rearward of the circuit board.

20. The luminaire of claim 19, comprising a light sensor positioned rearward of the circuit board and configured to receive the ambient light rays from or within the second end of the light pipe member.

* * * * *